US00RE34452E

United States Patent [19]

Taniguchi

[11] E Patent Number: Re. 34,452

[45] Reissued Date of Patent: Nov. 23, 1993

[54] CAMERA CAPABLE OF AUTOMATICALLY RESPONDING TO DATA CODED ON FILM

[75] Inventor: Nobuyuki Taniguchi, Tondabayashi, Japan

[73] Assignee: Minolta Camera Kabushiki Kaisha, Osaka, Japan

[21] Appl. No.: 629,164

[22] Filed: Dec. 19, 1990

Related U.S. Patent Documents

Reissue of:

[64] Patent No.: 4,437,742
Issued: Mar. 20, 1984
Appl. No.: 304,957
Filed: Sep. 23, 1981

U.S. Applications:

[63] Continuation of Ser. No. 440,481, Nov. 21, 1989, which is a continuation of Ser. No. 186,655, Apr. 19, 1988, which is a continuation of Ser. No. 841,796, Mar. 20, 1986.

[30] Foreign Application Priority Data

| | | | |
|---|---|---|---|
| Oct. 9, 1980 | [JP] | Japan | 55-141302 |
| Oct. 9, 1980 | [JP] | Japan | 55-141303 |
| Oct. 29, 1980 | [JP] | Japan | 55-152579 |

[51] Int. Cl.[5] ..... G03B 7/00
[52] U.S. Cl. ..... 354/21; 354/105
[58] Field of Search ..... 354/21, 105, 109, 236

[56] References Cited

U.S. PATENT DOCUMENTS

| | | | |
|---|---|---|---|
| 3,576,369 | 4/1971 | Wick et al. | 354/236 |
| 4,159,168 | 6/1979 | Sumi et al. | 354/21 |
| 4,173,401 | 11/1979 | Harvey | 354/21 |
| 4,200,371 | 4/1980 | Suzuki et al. | 354/21 |
| 4,215,920 | 8/1980 | Butler | 354/105 |

FOREIGN PATENT DOCUMENTS

| | | | |
|---|---|---|---|
| 54-4123 | of 0000 | Japan . | |
| 45-5422 | of 0000 | Japan . | |
| 53-130333 | of 0000 | Japan . | |
| 55-134828 | of 0000 | Japan . | |
| 416323 | 1/1967 | Switzerland | 354/21 |
| 1031771 | 6/1966 | United Kingdom | 354/21 |

*Primary Examiner*—Russell E. Adams
*Attorney, Agent, or Firm*—Watson, Cole, Grindle & Watson

[57] ABSTRACT

A camera includes a detector for detecting codes provided on a film as the film advances, another detector for detecting sprocket holes provided on the camera so as to detect the speed of film advance, a register for registering signals representative of codes at a speed relative to the speed of film advance, and a device for reading the registered data. Accordingly, the codes on the film informs the camera of various data, such as film speed, available exposure frame number, etc., and the camera automatically sets these data for the proper photographing operation.

5 Claims, 8 Drawing Sheets

CAMERA CAPABLE OF AUTOMATICALLY RESPONDING TO DATA CODED ON FILM

Matter enclosed in heavy brackets [ ] appears in the original patent but forms no part of this reissue specification; matter printed in italics indicates the additions made by reissue.

*This application is a continuation of application Ser. No. 440,481, files Nov. 21, 1989, which is a continuation of application Ser. No. 186,655, files Apr. 19, 1988, which is a continuation of application Ser. No. 841,796, files Mar. 20, 1986, which is a Reissue of application Ser. No. 304,957, filed Sep. 23, 1981, now U.S. Pat. No. 4,437,742.*

BACKGROUND OF THE INVENTION

1. Field of the Invention

The present invention relates to a camera capable of automatically responding to data coded on a film. More particularly it relates to a camera which automatically reads data, such as film speed (ASA No.) and available frame numbers, coded on a film at its leading portion ahead of the first frame, or at a portion outside the frame and near sprocket holes in a form of code perforations, or on a cartridge (Patrone) of the film.

2. Description of the Prior Art

A film provided with code perforations and a camera for reading such code perforations are disclosed in, for example: RESEARCH DISCLOSURE April 1980 Number 192 particularly on page 142; Japanese Utility Model Publication (Jikkosho) 45-5422; Japanese Patent application laid open to publication (Tokkaisho) 55-134828; and Japanese Utility Model Application laid open to publication (Jikkaisho) 55-130333. Also a film cartridge provided with coded marking indicating the film speed is disclosed in USP 4,200,371.

SUMMARY OF THE INVENTION

It is an object of the present invention to provide a camera which can automatically respond to coded perforation in the film with high accuracy.

It is another object of the present invention to provide a camera of the above described type which can read the coded perforation in the film with high accuracy.

It is a further object of the present invention to provide a camera of the above described type which can display the number of available frames to be photographed using the information obtained from the coded perforations.

It is a still further object of the present invention to provide a camera of the above described type wherein the information obtained from the coded perforations can be used for information the completion of film winding.

It is yet another object of the present invention to provide a camera of the above described type which can temporarily set information in the camera even when there is no information from the film or when there is no film loaded in the camera to permit the use of film without any coded perforations or to permit the camera operation with no film as one often does when examining the camera.

It is a still further object of the present invention to provide a camera of the above described type wherein the information obtained from the coded perforations can be used for automatically rewinding the film after all the frames are exposed.

BRIEF DESCRIPTION OF THE DRAWINGS

These and other objects and features of the present invention will become apparent from the following description taken in conjunction with a preferred embodiment thereof with reference to the accompanying drawings, throughout which like parts are designated by like reference numerals, and in which.

DESCRIPTION OF THE PREFERRED EMBODIMENT

Figure 1:
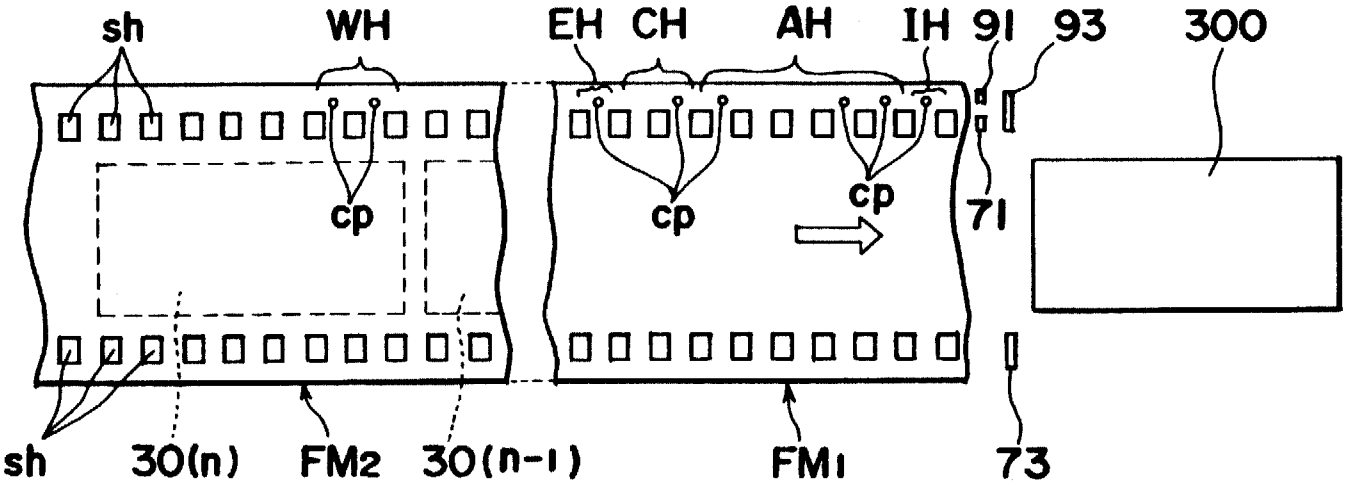
FIG. 1 is a diagrammatic view showing portions of a film provided with coded perforations.

Referring to FIG. 1, there is shown an example of film having a plurality of coded perforations cp located closely adjacent to one side edge of the film at portions between sprocket holes sh but in offset relation to the alignment of the sprocket holes sh. A first film section FM1 shown is located at leading portion of the film before the first frame and a second frame film section FM2 shown is located at end portion of the film containing the last frame 30(n) (n is an available frame number.), and the whole film is understood to advance in a direction indicated by an arrow as it is wound on a take up spool (not shown). The coded perforations cp are provided in particular sections explained below. A first section IH has one coded perforation cp which indicates the start of a series of coded perforations carrying information about film. Then comes a section AH for indicating the film speed, for example, ASA number. In the section AH there are five available rooms for forming the coded perforations but there are shown only three to provide a five-bit binary coded signal of "11001". A third section CH having two rooms for forming the coded perforations is provided for setting the information of available frame numbers, and in the example shown, it provides binary coded signal of "10". A fourth section EH has one coded perforation cp for indicating the end of coded perforations carrying information about film. The above described sections IH, AH, CH and EH are provided in sequence in said order in the first film section FM1. Furthermore, there is another section WH located at the end portion of the film above the last frame 30(n) for actuating an automatic rewind mechanism. It is to be noted that the film given in the example is a standard 35 mm film in which 8 sprocket holes sh cover one frame.

A reference numeral 300 designates an exposure frame where a shutter curtain (not shown) is located and reference numerals 71 and 91 designate detecting elements for detecting sprocket holes sh and coded perforations cp, respectively, as the film advances. As understood from FIG. 1, the detecting elements 71 and 91 are positioned one above the other and so are the rows in which the coded perforations and sprocket holes are aligned. Therefore, it is necessary to keep the film in position to ensure that the coded perforations and sprocket holes move past the detectors 71 and 91 without failure.

Instead of detecting elements 71 and 91, it is possible to employ detecting elements 73 and 93 in which the element 73 detects only the sprocket holes sh and the element 93 detects both the sprocket holes sh and coded perforations cp. In this case, the coded perforations cp can be detected by a logic circuit in which the output signals from the detecting elements 73 and 93 are processed. When the detecting elements 73 and 93 are employed, the sprocket holes sh and coded perforations cp can be detected without failure even if the film should deviate up or down when viewed in FIG. 1.

Furthermore, in the case where the detecting elements 73 and 93 are employed, the coded perforations cp can be aligned in the same row as the row of sprocket holes sh.

Moreover, instead of employing two detecting elements 73 and 93, it is possible to employ only one element 93. In this case, the element 93 is provided in association with a pulse duration detector which discriminates the coded perforations from the sprocket holes by the difference in time it takes to move the coded perforation and sprocket hole past the element 93.

Figure 15:
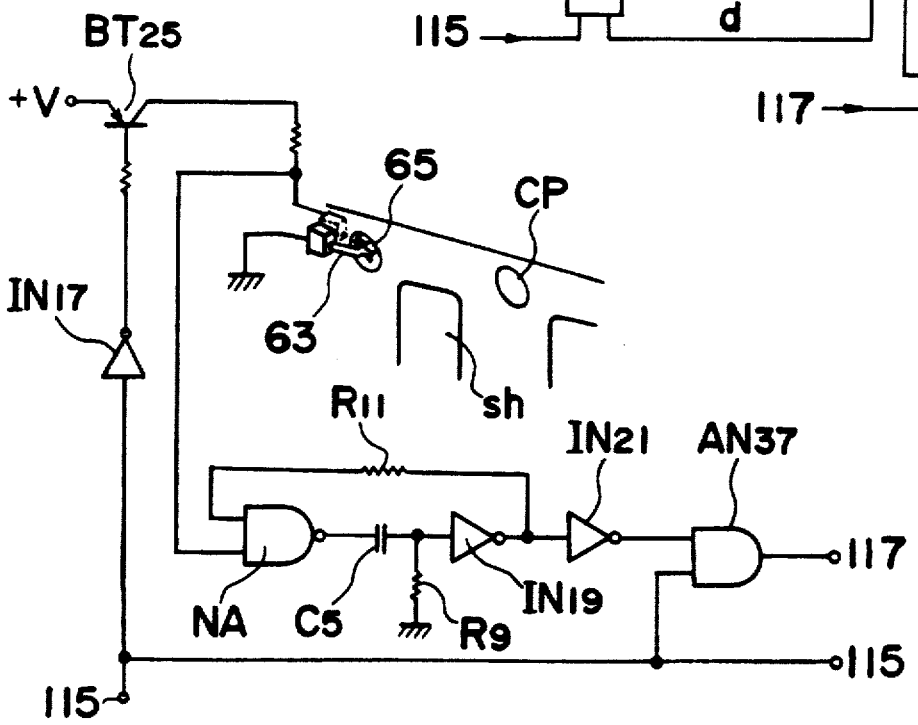
FIG. 15 is a circuit diagram showing a further example of coded perforation detector shown in FIG. 2.

Each of the above described detecting elements 71, 91, 73 and 93 can be formed by any known element, for example, a photocoupler of a transparent type in which a light emission portion and light receiving portion are positioned on opposite sides of the film or of a reflection type in which the light emission portion and light receiving portion are positioned on the same side of the film. Another example is a combination of roll mounted with a conductive rubber and a contact member which are positioned on the opposite sides of the film. Further example is the use of an element that detects the change of magnetic flux, or a mechanical contact element, as shown in FIG. 15.

Figure 2:
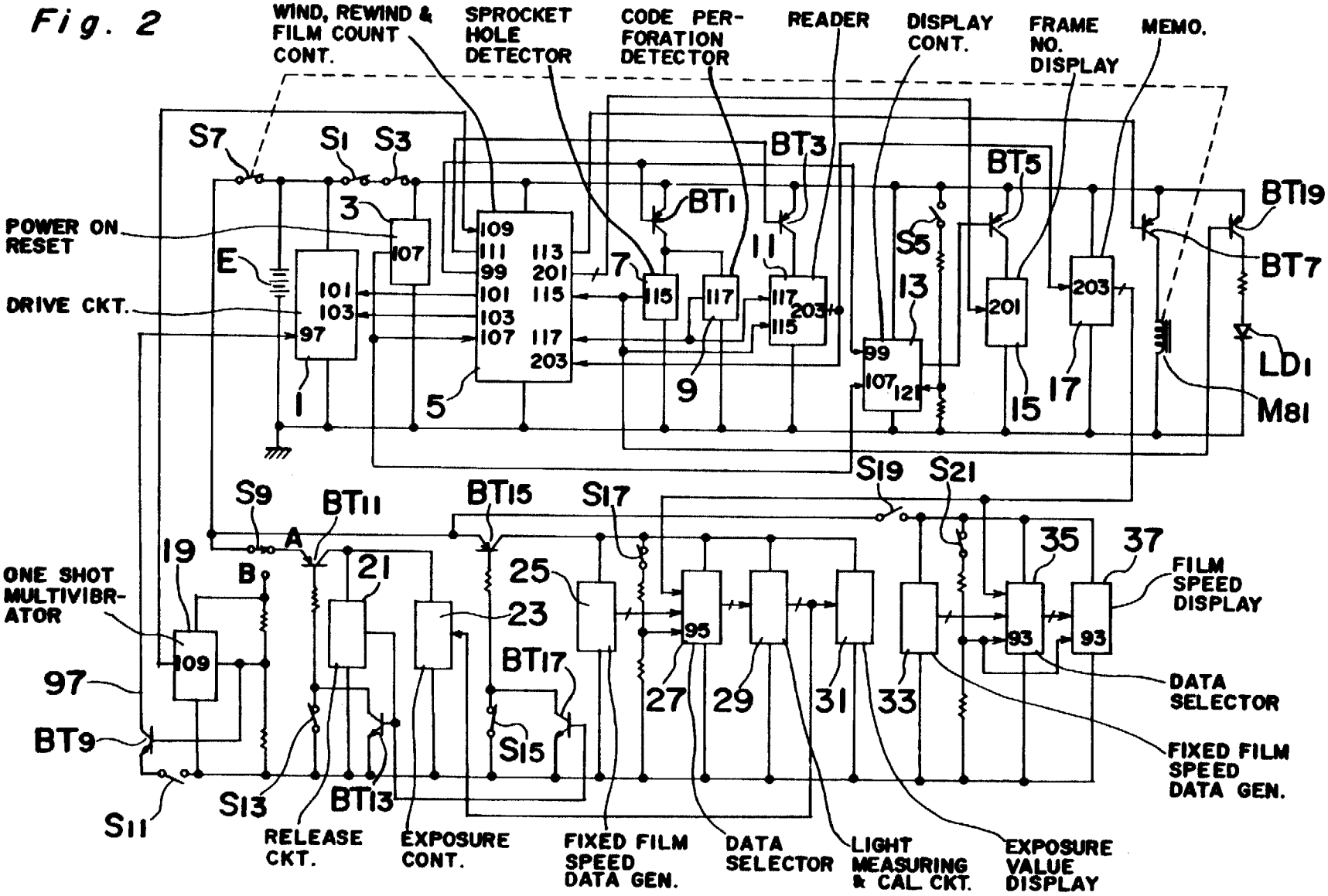
FIG. 2 is a block diagram of a circuit employed in a camera of the present invention.

Referring to FIG. 2, there is shown a block diagram of a circuit employed in a camera of the present invention. In the circuit a reference character E designates a source of power, e.g., a battery, a 1 designates a drive circuit for driving a motor to wind and rewind the film and also for exciting electromagnets that control clutches. A detail of the drive circuit 1 will be described later in connection with FIG. 4. A reference character S1 designates a switch which closes when a film is loaded, and S2 designates a switch which closes when a camera's back cover (not shown) is closed. A reference numeral 3 is a power on reset circuit for producing a reset signal from its terminal 107 when the power is turned on, and a reference numeral 5 designates a wind rewind and film count control which will be described in detail later in connection with FIG. 3. A reference numeral 7 designates a sprocket hole detector for detecting the sprocket holes sh upon receipt of a signal from the detecting element 71 and for producing a sprocket hole signal from its terminal 115, and a reference numeral 9 designates a coded perforation detector for detecting the coded perforations cp upon receipt of a signal from the detecting element 91 and for producing coded perforation signal from its terminal 117. A transistor BT1 has its emitter connected to a power line, collector connected to the detector 7 and 9 and base connected to a terminal 99 of the wind rewind and film count control 5. Since the terminal 99 produces a low level signal during the film loading, winding and rewinding of the film, the detectors 7 and 9 are supplied with power during said period. It is to be noted that the term film loading used herein means not only the positioning of the film carriage in the camera but also the advancement of film until the first frame is positioned in from of the exposure frame 300.

A reference numeral 11 designates a reader for reading data of coded perforations upon receipt of signals from the output terminals 115 and 117 of the detectors 7 and 9, respectively. The reader 11 receives power through a transistor BT3 during a period of time when a terminal 111 of the wind rewind and film count control 5 produces a low level signal, i.e., during the film loading operation. The reader 11 is described in detail later in connection with FIG. 5.

A reference character 15 designates a display for displaying a number of available frames left in the camera. The display 15 should preferably be formed by a liquid crystal arranged to show figures of numeral. The display 15 receives power through a transistor BT5 which is controlled by a display control 13. The display control 13 produces a low level signal to the transistor BT5 for a predetermined period of time upon closure of a switch S5 by a manual operation to provide a high level signal to its input 121 or upon receipt of a step up signal from the terminal 99 at the end of winding or rewinding operation, and during said predetermined period of time, the display 15 is actuated to carry out the display of remaining frame number. The detail of the display control 13 will be described later in connection with FIG. 7.

A reference character 17 designates a memory for memorizing data of film speed obtained from the reader 11. The memorized film speed data is applied through a data selector 27 to a light measuring and calculation circuit 29 before each exposuring operation. An electromagnet Mg1 controls on and off states of the switch S7, and is controlled by a transistor BT7. The transistor BT7 is turned to conductive state when the terminal 113 of the wind rewind and film count control 5 produces a low level signal during the loading and rewinding of the film, and accordingly, during which the switch S7 open to prevent the supply of power to the above described circuits, 1, 3, 5, 7, 9, 11, 13, 15 and 17. Thus, during the loading and rewinding of the film, the control of exposure is disabled. A light emitting diode LD1 is connected to a transistor BT19 which is in turn connected to a terminal 115 of the sprocket hole 7 for effecting the blinking of light emitting diode LD1 during the advance of the film.

A switch S9 provided in association with a shutter release mechanism (not shown) is connected to a terminal A, as shown in FIG. 2, upon completion of shutter charge, and is connected to a terminal B at the end of exposure control operation to produce a pulse having a predetermined pulse duration from a terminal 109 of a one shot multivibrator 19. The pulse produced from the multivibrator 19 is applied to the control 5 to effect the generation of start winding signal. Thereafter, if the shutter remains uncharged, the switch S9 stays in such a condition that it is connected to the terminal B, and accordingly, release circuit 21 and exposure control 23 are disconnected from the power regardless of closure of a switch S13.

A switch S11 opens when the film is loaded, and closes when the film is not loaded. Thus, when the film is not loaded, the transistor BT9 conducts upon completion of exposure control to produce a drive signal for driving a film winding motor to charge the shutter. This switch S11 is provided to produce a substitutive drive signal, because when film is not loaded the control 5 receives no power, and accordingly, no drive signal is produced from the control 5.

A reference character S13 designates a switch provided in association with a two-step shutter release button (not shown) such that the switch S13 closes when the two-step shutter release button is depressed all the way. When the switch S13 closes, the transistor BT11 is turned to conductive state to supply power to the release circuit 21 and exposure control 23. Then, when the release circuit releases the shutter mechanism, transistors BT13 and BT17 are turned to conductive state to maintain the transistors BT11 and BT15 in conductive state regardless of opening of the switches S13 and S15. Thereafter, when the exposure control 23 completes the exposure control operation, the switch S9 is connected to the terminal B to disconnect power from the release circuit 21 and exposure control 23, and accordingly, the transistors BT13 and BT17 are turned to non-conductive state.

A reference character S15 designates a switch provided in association with the shutter release button such that the switch S15 closes when the two-step shutter release button is depressed halfway. When the switch S15 closes, the transistor BT15 is turned to conductive state to permit power transmission therethrough to each of fixed film speed data generator 25, data selector 27, light measuring and calculation circuit 29 and exposure value display 31. Accordingly, the fixed film speed data generator 25 generates a data corresponding to, for example, ASA 100. A switch S17 closes when the film is loaded to supply a high level signal to a terminal 95 of the data selector 27, and on the contrary, it opens when the film is not loaded to supply a low level signal to the terminal 95. When the data selector 27 receives to its terminal 95 a high level signal, it produces from its output a data obtained from the fixed film speed data generator 25. The above operation is to permit blank shot, i.e., shutter release with no film loaded in the camera, as one often does when he examines the camera. More particularly, the light measuring and calculation circuit 29 operates when it is provided with film speed data, but when there is no film loaded, it does not operate, and accordingly, the camera itself does not operate. To avoid this, the fixed film speed data generator 25 supplies a temporary film speed data to the light measuring and calculation circuit 29.

A data from the data selector 27 is supplied to the light measuring and calculation circuit 29 for carrying out an exposure value calculation through known steps. The calculated exposure value is supplied to exposure value display 31 and also to exposure control 23.

A reference character S19 designates a manually operable switch which an operator closes when he wants to check the film speed. When this switch S19 closes, power is supplied to fixed film speed data generator 33, data selector 35 and film speed display 37. It is to be noted that the fixed film speed data generator 33, switch S21 and data selector 35 have the same structure as the above mentioned circuits 25, S17, and 27, respectively. Thus, when film is loaded, the data selector 35 produces film speed data obtained from the memory 17, and on the contrary, when film is not loaded, the data selector 35 produces film speed data from the fixed film speed data generator 33. The film speed display 37 displays only the data obtained from the data selector 35 when its terminal 93 receives a high level signal, and displays both the data obtained from the data selector 35 and an indication of no film loaded when its terminal 93 receives a low level signal.

It is to be noted that each of the switches S17 and S21 can be arranged as a manually operable switch, and, at the same time, each of the fixed film speed data generators 25 and 33 can be of a manually selectable type to allow the setting of film speed for the films without coded perforations cp, or the setting of film speed other than that obtained from the coded perforations, for example, in the case of override photographing or high speed development.

Figure 3:
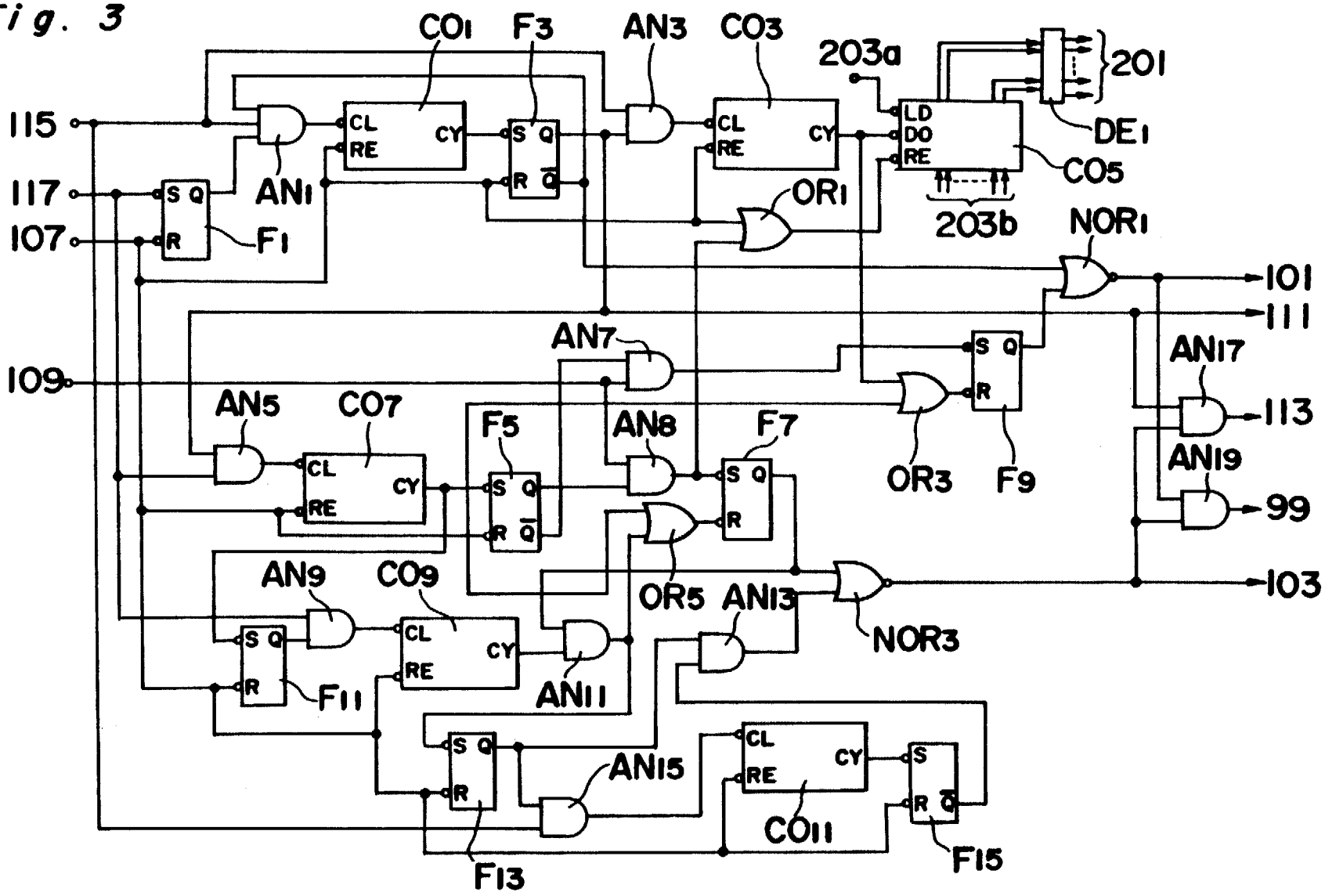
FIG. 3 is a circuit diagram of a wind rewind and film count control shown in FIG. 2.

Referring to FIG. 3, there is shown a circuit diagram of wind rewind and film count control 5. When the switches S1 and S3 close to start the power supply, the terminal 107 produces a power on reset signal which is applied to each one of flip-flop circuits F1 to F15 and also to each one of counters CO1 to CO11 to reset the same. Thereupon, a $\overline{Q}$ terminal of film-flop F3 produces a high level signal, and accordingly, a NOR gate NOR1 produces a low level signal through an output terminal 101. Furthermore, the low level signal from the NOR gate NOR1 causes an AND gate AN19 to produce a lower level signal through an output terminal 99 to actuate the detectors 7 and 9. Moreover, since Q terminal of flip-flop F3 is producing a low level signal through an output terminal 111, the reader 11 is actuated.

As the film advances, the detector 9 supplies data of the first coded perforation cp in the section IH from its terminal 117 to a set terminal of the flip-flop F1, and therefore, the Q terminal of the flip-flop F1 produces a high level signal. At this moment, since $\overline{Q}$ terminal of the flip-flop F3 is producing a high level signal, a train of pulses obtained from the terminal 115 of sprocket hole detector 7, as the sprocket holes move past the detector 71, is supplied through an AND gate AN1 to clock terminal CL of the counter CO1. The counter CO1 is a type which can register m count, and when it receives m-th clock pulse, it produces a pulse from its carry terminal CY. It is to be noted that the number m is determined by the number of sprocket holes sh counted from the one that comes first from the coded perforation cp in the section IH up to the one which is located just before the first frame. When the counter CO1 produces a pulse from its carry terminal CY, the flip-flop F3 is set to produce a low level signal from the terminal $\overline{Q}$. At this moment, since the flip-flop F9 is reset, and thus its Q terminal is producing a low level signal, the NOR gate NOR1 produces a high level signal through the output terminal 101 to stop the motor that winds the film. Accordingly, the film is advance to locate the first frame 30(1) in front of the exposure frame 300.

It is to be noted that during the loading of the film the reader 11 is actuated in a manner described later to set the available frame number in the down counter CO5.

When the switch S13 closes upon pressing of the release button, an exposure control operation is carried out in the exposure control 23, and thereafter, an exposure completion signal is produced from the terminal 109 of one shot multivibrator 19. Since the flip-flop F5 is reset at this moment, the exposure completion signal is applied through AND gate AN7 to set terminal of flip-flop F9, which is, thereupon, set to produce a high level signal from its Q terminal. Accordingly, NOR gate NOR1 produces a low level signal through terminal 101, and at the same time, AND gate AN19 produces a low level signal through terminal 99. The low level signal from the terminal 101 actuates the drive circuit 1 to drive the motor causing film wind up and shutter charge, and the low level signal from the terminal 99 actuates the detectors 7 and 9. At this moment, since flip-flop F3 is set, a train of pulse signals indicative of sprocket holes obtained from output terminal 115 of sprocket hole detector 7 is applied through AND gate AN3 to clock terminal CL of counter CO3. The counter CO3 is a binary counter capable of counting 8 input pulses. When the 8th pulse is applied, the counter CO3 produces a pulse from its carrier terminal CY, and the pulse produced from the carrier terminal CY is applied to a down-count terminal DO of a down counter CO5 for counting down by 1. Furthermore, the pulse produced from the carrier terminal CY of the counter CO3 is applied through OR gate OR3 to reset terminal R of flip-flop F9 to reset the same. Accordingly, NOR gate NOR1 produces a high level signal through the terminal 101 to stop the drive motor, thus stop winding the film. And AND gate AN19 produces a high level signal through the terminal 99 to stop the operation of detectors 7 and 9. The purpose to stop the drive motor after counting 8 sprocket holes is to advance the film by one frame in which there are 8 sprocket holes.

The above described operation is repeatedly carried out before the penultimate frame 30(n−1) comes in front of the exposure frame 300. During the operation, the output data from the down counter CO5 corresponds to a numeral data indicative of remaining frame number, and this numeral data is converted into display data by decoder DE1, and, in turn, applied to terminal 201 of the frame number display 15.

When the penultimate frame 30(n−1) is exposed and wound, the last frame 30(n) comes in front of the exposure frame 300. During the advancement of the last frame to the exposure frame 300, the coded perforations cp in the section WH are detected by the detector 9, which accordingly produces two pulse signals. Since flip-flop F3 is in the set condition, these two pulse signals are applied from the terminal 117 through AND and AN5 to counter CO7. The counter CO7 is a binary counter capable of counting 2 input pulses, and when the second of the above mentioned 2 input pulses is applied, it generates a pulse from its carry terminal CY. The pulse produced from the carry terminal CY of the counter CO7 is used for setting flip-flops F5 and F11, and in turn, for opening AND gates AN8 and AN9. Thereafter, when the terminal 109 receives an exposure completion signal from one shot multi-vibrator 19, flip-flop F7 is reset and its Q terminal produces a high level signal. Accordingly, NOR gate NOR3 produces a low level signal which is applied through the terminal 103 to the drive circuit 1 to actuate the motor such that it rewinds the film. Furthermore, the exposure completion signal which has passed through the AND gate AN8 is applied through OR gate OR1 to a reset terminal RE of down-counter CO5. Accordingly, the down-counter CO5 is reset and produces data indicating that the remaining frame number is zero, which is in turn applied to frame number display 15.

When the rewinding of the film starts in response to the low level signal from the terminal 103, AND gate AN19 produces a low level signal from the terminal 99 to actuate the detectors 7 and 9. Accordingly, pulse signals corresponding to the coded perforations cp obtained from the terminal 117 of the detector 9 are applied through AND gate AN9 to counter CO9 capable of counting three pulses. Therefore, during the rewinding, the counter CO9 first counts 2 pulses upon detection of 2 coded perforations cf in the section WH, and when it counts the third pulse upon detection of coded perforation cf in the section EH, it produces a pulse from its carry terminal CY. At this moment, since Q terminal of flip-flop F7 is producing a high level signal, the AND gate AN11 is maintained open, and accordingly, the pulse produced from the carry terminal CY of the counter CO9 is applied through the AND gate AN11 or OR gate OR5, and in turn, to a reset terminal R of flip-flop F7 and also to a set terminal of flip-flop F13. When the flip-flop F7 receives a pulse to its reset terminal R, it produces from its Q terminal a low level signal which is then applied to NOR gate NOR3. On the other hand, when flip-flop F13 receives a pulse to its set terminal S, it produces a high level signal from its Q terminal for opening AND gates AN13 and AN15. Accordingly, a train of pulse signals obtained from the terminal 115 upon detection of sprocket holes sh are fed through AND gate AN15 to a clock terminal CL of the counter CO11, and a high level signal from $\overline{Q}$ terminal of flip-flop 15, which is at this moment held in a reset condition, is applied through the AND gate AN13 to NOR gate NOR3. Thus, the NOR gate NOR3 continues to produce a low level signal to continue the rewinding operation.

The counter CO11 is a binary counter capable of counting k pulses. For example, when the film to be loaded in the camera has coded perforations cf as shown in FIG. 1, it is preferable to set k about 10 to 15. When the counter CO11 receives kth pulse to its clock terminal CL, it produced a pulse from its carry terminal CY for setting flip-flop F15. When the flip-flop F15 is set, it produces a low level signal from its $\overline{Q}$ terminal, and accordingly, AND gate AN13 produces a low level signal and NOR gate NOR3 produces a high level signal which is applied through the terminal 103 to the drive circuit 1 to stop the motor, thus stop rewinding the film.

An AND gate AN17 produces a low level signal when either one of terminal 111 or 103 is producing a low level signal, i.e., when the reader 11 is in an operating condition and/or when rewinding operation is being carried out. The low level signal produced from the AND gate AN17 conducts the transistor BT7 to excite the electromagnetic MG1, and accordingly, the switch S7 is turned off to cut power to the circuits which control the exposure.

Figure 4:
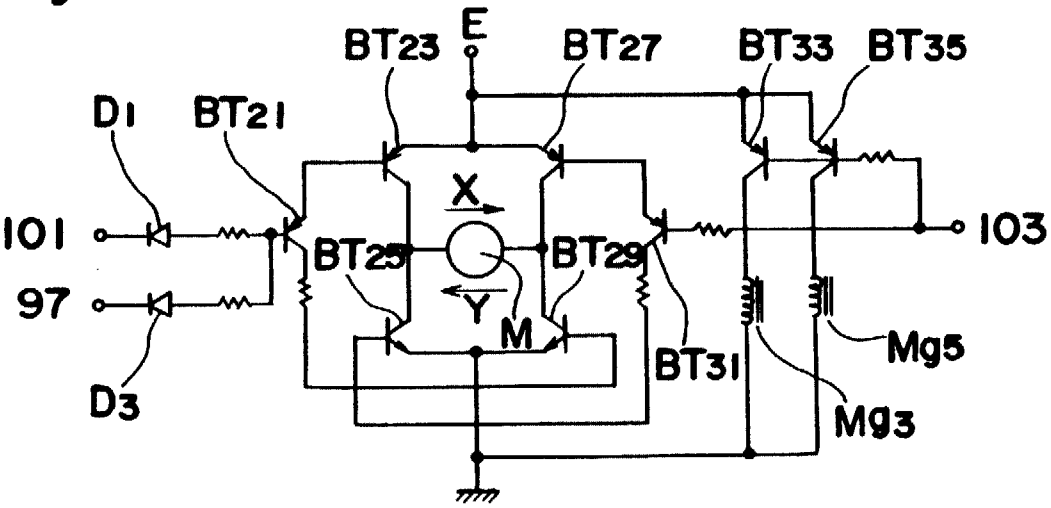
FIG. 4 is a circuit diagram of a drive circuit shown in FIG. 2.

Referring to FIG. 4, there is shown a circuit diagram of drive circuit 1 having motor M and electromagnets Mg3 and Mg5 for actuating a clutch mechanism (not shown) that controls the driving force transmission to a drive axle (not shown). When either one of terminal 101 or 97 receives a low level signal, transistor BT21 conducts, and accordingly, transistors BT23 and BT29 conduct. Therefore, the motor M receives electric current in the direction X to rotate in one direction, effecting the film loading, film winding and shutter charging.

On the contrary, when the terminal 103 receives a low level signal, transistors BT33 and BT35 conduct to excite electromagnets Mg3 and Mg5. The excitation of electromagnet Mg3 establishes a driving power transmission between motor M and rewind mechanism (not shown), and the excitation of electromagnet Mg5 cuts driving power transmission between motor M and wind-up mechanism (not shown) and also between motor M and shutter charge mechanism (not shown). Furthermore, the low level signal from the terminal 103 conducts transistor BT31, and accordingly, transistors BT25 and BT27 conduct. Therefore, the motor M receives electric current in the direction Y to rotate in a direction opposite to above mentioned one direction, effecting the film rewinding.

Although the circuit shown in FIG. 4 has only one motor M for effecting operations of film loading, film winding, shutter charging, and film winding, it is possible to provide a motor for effecting one operation, and in this case, it is preferable to employ a pulse motor for effecting the film winding. Furthermore, the clutch mechanism, which has been described as controlled by electromagnets Mg3 and Mg5, can be totally controlled by a mechanical arrangement.

Figure 5:
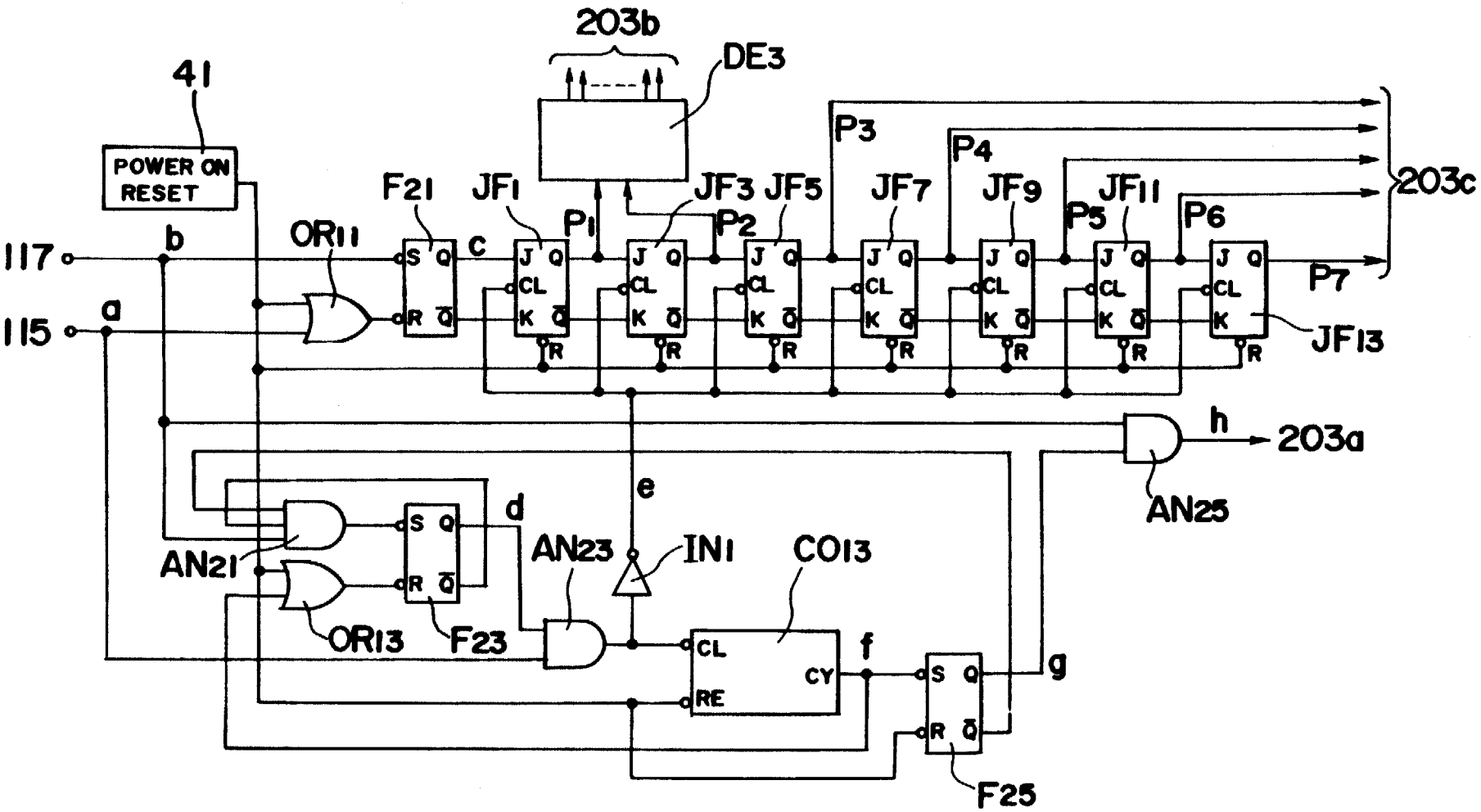
FIG. 5 is a circuit diagram of a reader shown in FIG. 2.
Figure 6:
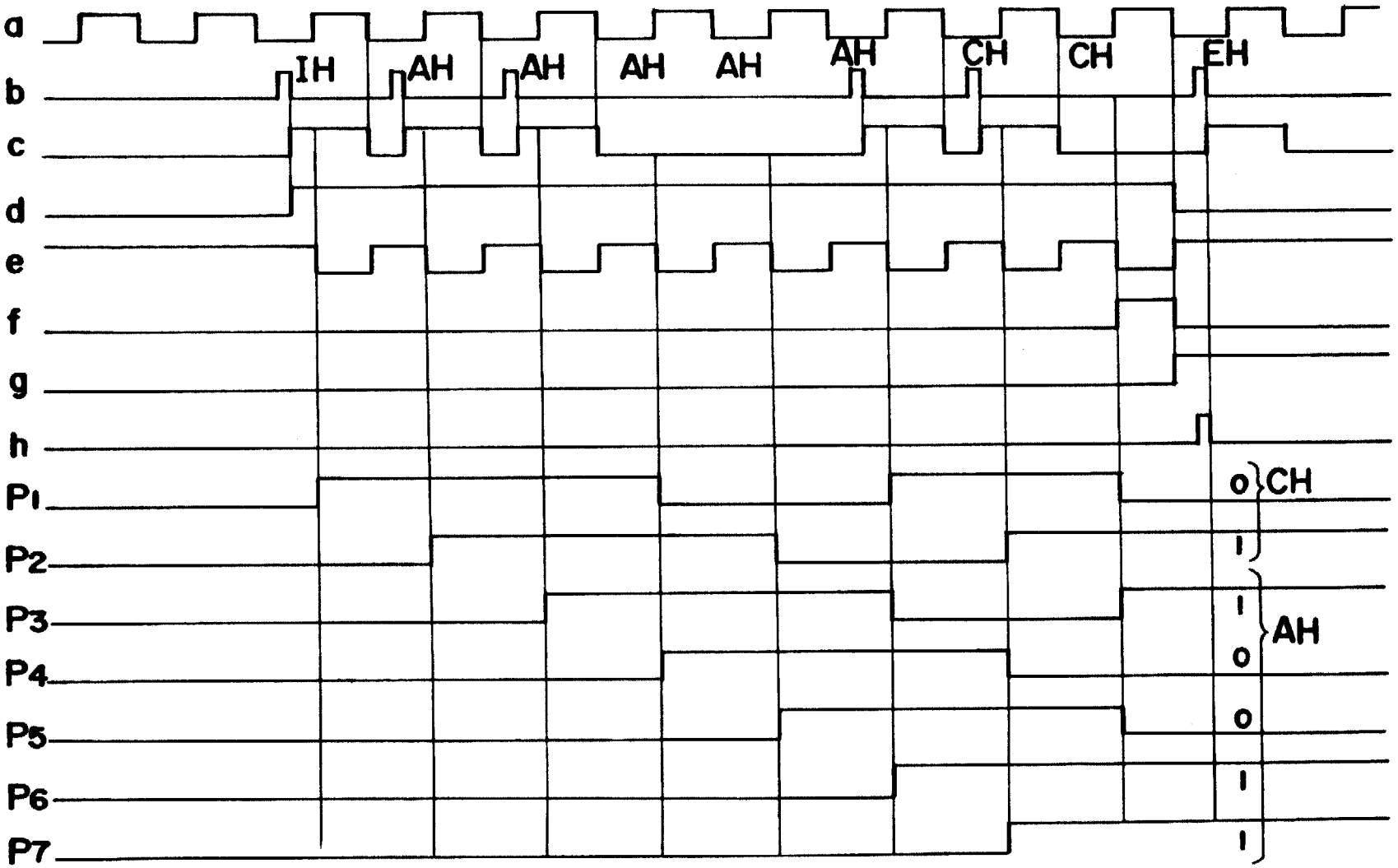
FIG. 6 is a graph showing waveforms of signals obtained at major points in the circuit of FIG. 5.

Referring to FIG. 5, there is shown a circuit diagram of the reader 11, and various waveforms obtained from major points in the circuit of reader 11 are shown in FIG. 6. The terminal 115 receives a train of pulses (waveform a) upon detection of sprocket holes sh, and the terminal 117 receives pulses (waveform b) upon detection of coded perforations cf.

A reference numeral 41 designates a power on reset circuit for producing a reset signal when the transistor BT3 conducts to supply power to the reader 11. When the reset signal is produced, it is applied to reset terminal of each of flip-flops F21, F24 and F25, counter CO13 and JK flip-flops JF1 to JF13. The flip-flop F21 is turned to reset condition by the step down of a Pulse (waveform a) which is applied thereto from the terminal 115 through OR gate OR11, and is turned to set condition by the step down of a pulse obtained from the terminal 117. Since flip-flops F23 and F25 are both in reset condition before the terminal 117 receives first pulse (i.e., before the detection of coded perforation in the section IH), the $\overline{Q}$ terminal of both flip-flops F23 and F25 produces a high level signal for opening AND gate AN21. When the terminal 117 receives the first pulse, it is applied through the AND gate AN21 to set terminal of flip-flop F23, and accordingly, the flip-flop F23 is turned to set condition by the step down of the first pulse from the terminal 117. When the flip-flop F23 is turned to set condition, it produces a high level signal (waveform d) from its Q terminal for opening AND gas AN23, applying the train of pulses (waveform a) to clock terminal CL of a counter CO13, which is capable of counting 8 pulses, and also to an inverter IN1 which produces a train of pulses (waveform e) having a phase opposite to that obtained from the terminal 115.

The JK flip-flops JF1 to JF13, defining a shift register, receive pulses (waveform e) from the inverter IN1 to their clock terminal CL for shifting, in response to each pulse, an information carried in one JK flip-flop, e.g., JF1, to the next JK flip-flop, e.g., JF3. The waveforms P1, P2, P3, P4, P5, P6 and P7 show outputs from Q terminals of JK flip-flops JF1, JF3, JF5, JF7, JF9, JF11 and JF13, respectively.

When the counter CO13 has counted 8 pulses of sprocket holes, it produces a pulse (waveform) from its carry terminal CY for resetting the flip-flop F23 and also for setting the flip-flop F25 (waveforms d and g). When the flip-flop F23 is reset, it produces a low level signal (waveform d) from its Q terminal for closing the AND gate AN23, thus no further pulse is applied to the counter CO13 and to the inverter IN1, and accordingly, no shifting operation is carried out in the JK flip-flops JF1 to JF13. Thus, at this moment, JK flip-flops JF13 to JF5 hold a binary coded signal "11001" indicative of film speed as coded in the section. AH of the film, and JK flip-flops JF3 and JF1 hold a binary coded signal "10" indicative of frame number as coded in the section CH of the film.

When the flip-flop F25 is turned to set condition, its Q terminal produces a high level signal (waveform g) for opening AND gate AN25. Thus, the AND gate AN25 produces a pulse (waveform h) obtained from the terminal 117 to an output terminal 203a. The pulse produced from the output terminal 203a is applied to a data load terminal LD of the down counter CO5 shown in FIG. 3 for presetting, in response to the step down of the pulse from the terminal 203a, output data of decoder DE3 determined by the signal obtained from the JK flip-flops JF1 and JF3. Furthermore, the binary coded signal 203c obtained from JK flip-flops JF5 to JF13, and the pulse signal from the terminal 203a are applied to the memory 17 (FIG. 2) for memorizing the film speed data from the terminals 203c in response to the pulse from the terminal 203a.

Figure 7:
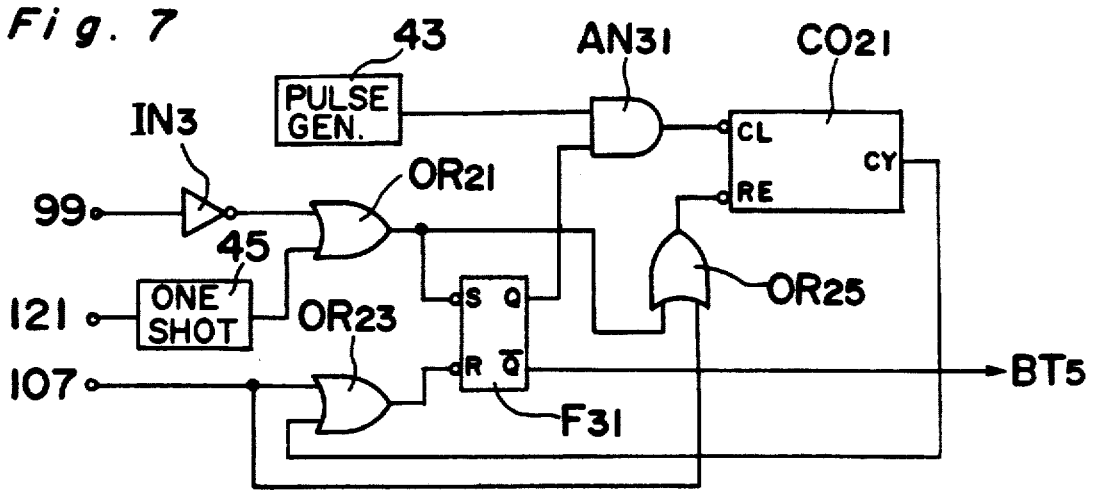
FIG. 7 is a circuit diagram of a display control shown in FIG. 2.

Referring to FIG. 7, there is shown a circuit diagram of the display control 13. When the switches S1 and S3 are turned on to supply power, the power on reset circuit 3 produces a pulse to the terminal 107, which is applied through OR gates OR23, OR25 to a reset terminal of each of flip-flop F31 and counter CO21. Thereafter, when winding of each film frame completes, the output from the terminal 99 of the control 5 changes from low to high, and thus the output from inverter IN3 changes from high to low. By the step down of output from the inverter IN3, flip-flop F31 is set to produce a high level signal from its Q terminal for opening AND gate AN31. Accordingly, clock pulses generated from a pulse generator 43 are transmitted to clock terminal CL of counter CO21 for counting a predetermined period of time. During this period, a low level signal produced from $\overline{Q}$ terminal of flip-flop F31 maintains the transistor BT5 in a conductive state to supply power to the frame number display 15. After the predetermined period of time, i.e., when the counter CO21 has finished counting the time, the counter CO21 produces from its carry terminal CY a pulse which is applied through OR gate OR23 to a reset terminal of flip-flop F31. Accordingly, the flip-flop F31 is reset to produce a low level signal from its Q terminal for closing the AND gate AN31, and a high level signal from its $\overline{Q}$ terminal for turning the transistor BT5 to non-conductive state. Thus, the counter CO21 stops counting, and the frame number display 15 stops displaying the remaining frame number.

Instead of receiving the step up signal at the terminal 99, a similar operation as described above can be carried out in a manner described below.

When the switch S5 is closed, a one shot multivibrator 45 actuates to produce a pulse which is applied through OR gate 21 to flip-flop F31. Thereafter the same operation as explained above is carried out to count a predetermined period of time in the counter CO21 for effecting the display of remaining film number.

Figure 8:
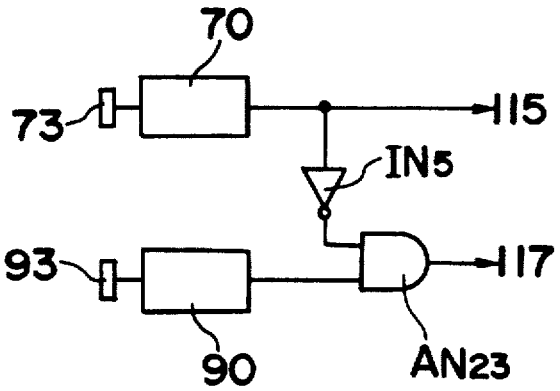
FIG. 8 is a block diagram showing a modification of detecting means for detecting sprocket holes and coded perforations.

Referring to FIG. 8, there is shown a modification of detecting means for detecting coded perforations and sprocket holes. The circuit shown employs two detecting elements 73 and 93 which are arranged in a manner shown in FIG. 1. The detecting element 73 detects sprocket holes sh only, and the detecting element 93 detects both the coded perforations cp and sprocket holes sh. Accordingly, detector 70 produces signal corresponding to sprocket holes and detector 90 produces signal corresponding to sprocket holes and coded perforations. The signal produced from the detector 70 is produced from the terminal 115 and applied, after having inverted in an inverter IN5, to AND gate AN33. The signal produced from the detector 90 is applied to AND gate AN33, and thus, the AND gate AN33 produces only the signal corresponding to coded perforations.

It is to be noted that the detecting means can be arranged in many other ways as described later in connection with FIGS. 11 to 15.

It is also to be noted that if the rated voltage for driving the motor M differs from that for actuating the other circuits, a suitable constant voltage producer should be connected to the battery E for applying an appropriate voltage to the other circuits, or otherwise two different batteries can be employed, one for the motor M and the other for the other circuits.

Figure 9:
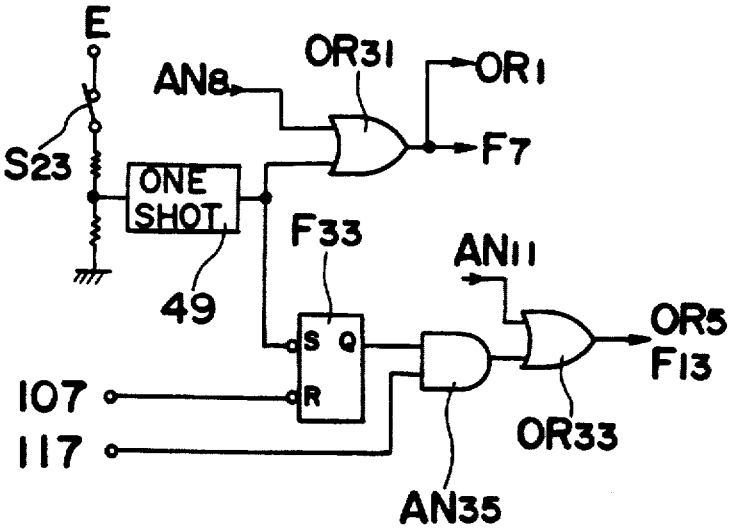
FIG. 9 is a diagram of a circuit for effecting the rewinding of a film before it is exposed to the last frame.

Referring to FIG. 9, there is shown a circuit for rewinding the film before it is exposed to the last frame. When a switch S23 is closed manually, a one shot multivibrator 49 produces a pulse which is applied through OR gate OR31 to flip-flop F7 (FIG. 3). Accordingly, the flip-flop F7 is set to produce a high level signal from its Q terminal, effecting the rewind of the film in the same manner described above. The pulse from the one shot multivibrator 49 is also applied to a set terminal of flip-flop F33, and accordingly, the flip-flop F33 is set to produce a high level signal from its Q terminal for opening an AND gate AN35. Thus, the AND gate AN35 permits signals of coded perforations to pass therethrough to OR gate OR33 and further to flip-flop F13 (FIG. 3). During the rewinding, the first signal of coded perforation that passes through the AND gate AN35 is the signal of coded perforation in the section EH. This coded perforation signal sets the flip-flop F13 to stop the rewind of the film after being rewound to a certain length.

Figure 10:
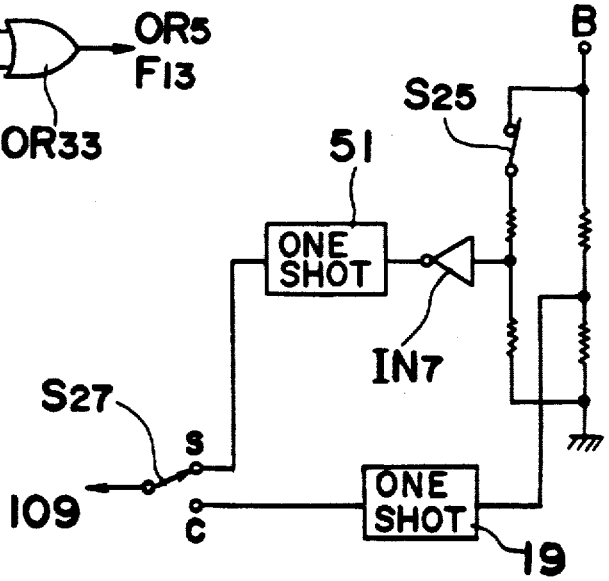
FIG. 10 is a diagram of a circuit for controlling successive winding and single winding of the film.

Referring to FIG. 10, there is shown a circuit for controlling successive winding and single winding of the film. When switch S27 is connected to terminal S as shown, the pulse produced from the one shot multivibrator 19 at the moment when the switch S9 (FIG. 3) is connected to the terminal B after the completion of exposure control, will not be applied through the terminal 109 to the wind, rewind and film count control 5. When the shutter release button, which has been depressed, returns to its projecting position, a switch S25 provided in association with the shutter release button opens to produce a high level signal from an inverter IN7, and accordingly, one shot multivibrator 51 produces a pulse which is applied through the switch S27 and terminal 109 to control 5 (FIG. 2) for effecting the film wind up.

On the contrary, when the switch S27 is connected to terminal C, one shot multivibrator produces, upon completion of exposure control operation, a pulse which is applied through terminal 109 to the control 5 (FIG. 2) for effecting the film wind up. Therefore, when the shutter release button is maintained in a depressed condition, film wind up and exposure control are carried out successively. It is to be noted that during the above operation, power for actuating inverter IN7 and one shot multivibrator 19 and 51 are supplied thereto from the terminal B.

It is to be noted that the switch S19 for effecting the film speed display can be of a type that closes in response to the pressing of shutter release button halfway, as in a manner arranged for the switch S15.

The description hereafter is directed to modifications of detecting means for detecting coded perforations and sprocket holes.

Figure 11:
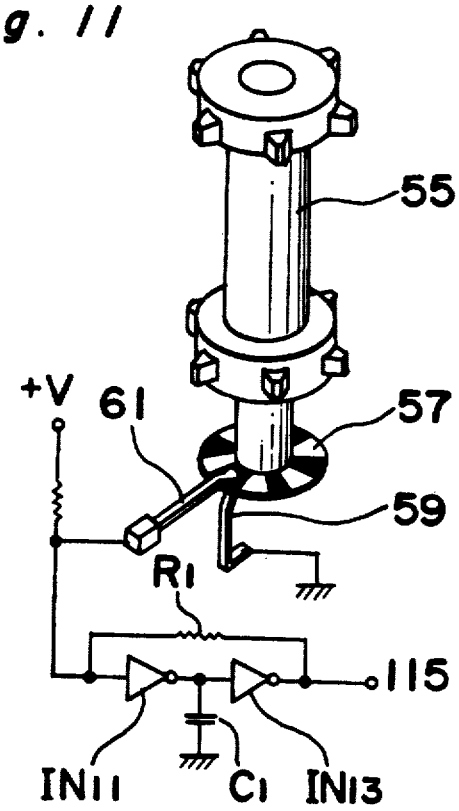
FIG. 11 is a diagram showing a modification of detecting means for detecting sprocket holes.

Referring to FIG. 11, there is shown a first modification of detecting means for detecting sprocket holes. A take-up spool 55 provided with teeth of film transport sprockets is integrally and coaxially provided with a coded disc 57 having conductive and non-conductive sections arranged alternatively. The conductive sections are disposed at positions corresponding to the teeth or sprockets on the take-up spool 55. In FIG. 11, sections marked in black correspond to the sprockets and are made of or coated with conductive material, and sections in white are made of or coated with non-conductive material. A pair of feelers 61 and 59 are provided on opposite sides of the coded disc 57 in face-to-face relation with each other through the disc. Therefore, when the take-up spool 55 rotates to advance the film, the disc 57 is also rotated causing electrical connection and disconnection between the feelers 61 and 59 repeatedly. More particularly, when the conductive section is present between the feelers 61 and 59, an inverter IN11 receives a low level signal, and when the non-conductive section is present between the feelers 61 and 59, the inverter IN11 receives a high level signal.

Still referring to FIG. 11, inverters IN11 and IN13, positive feed back resistor R1 connected between output of the inverter IN13 and input of the inverter IN11, and smoothing capacitor C1 connected between ground and junction between inverters IN11 and IN13 define a chattering elimination circuit. Accordingly, the output terminal 115 produces a pulse which is a reshaped pulse of the pulse applied to the input of the inverter IN11. It is to be noted that the chattering elimination circuit described above can be formed without employing the capacitor C1, and furthermore, the chattering elimination circuit can be arranged by other known circuits. Moreover, the power supply to the chattering elimination circuit can be controlled by the transistor BT1 shown in FIG. 2.

It is to be noted that the sprocket hole detecting means can be arranged in any other manner. For example, it can be formed by a pair of contacts having their ends biased towards each other with the film interposed therebetween so that the contacts make the electrical connection only when the sprocket hole passes between the ends of the contacts. Furthermore, the sprocket detecting means can be formed by using an optical detecting element.

Figure 12:
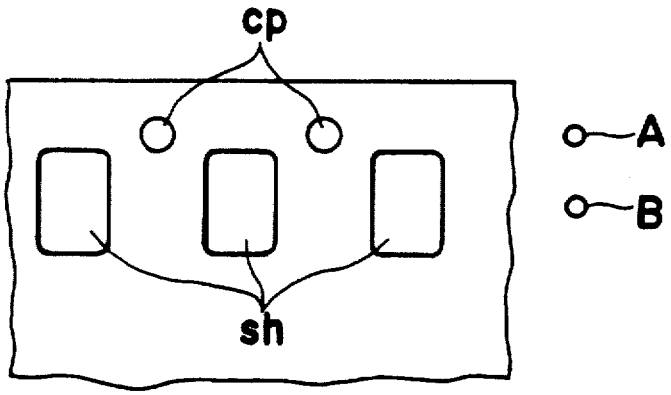
FIG. 12 is a diagram of a section of a film in an enlarged scale, particularly showing the positions of coded perforations and sprocket holes and the positions at which they are detected.

Referring to FIG. 12, there is shown a diagram of a section of the film in an enlarged scale having sprocket holes sh and coded perforations cp. It also shows the locations A and B at which the detecting means for detecting the coded perforations and detecting means for detecting the sprocket holes are positioned, respectively.

Figure 13:
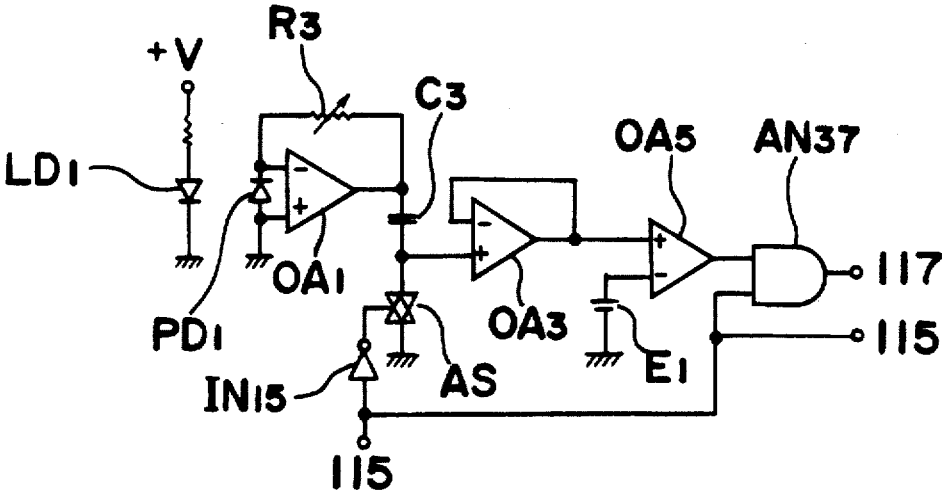
FIG. 13 is a circuit diagram showing an example of coded perforation detector shown in FIG. 2.

Referring to FIG. 13, there is shown an example of coded perforation detector 9. In FIG. 13, LD1 designates a light emitting diode and PD1 designates a light receiving element which are provided at the location A shown in FIG. 12 and are arranged to define a photocoupler of transparent type or reflective type. A circuit defined by light receiving element PD1, operational amplifier OA1 and adjusting feedback resistor R3 produces a voltage signal which has a level proportional to the intensity of light received by the light receiving element PD1. The terminal 115 receives signal representative of sprocket holes from the circuit shown in FIG. 11, and the received signal is applied through an inverter IN15 to an analog switch AS. During the presence of the sprocket holes, the terminal 115 receives a low level signal, and thus, the inverter IN15 produces a high level signal to open the analog switch AS. Accordingly, during the presence of the sprocket holes, the capacitor C3 is charged to a voltage level corresponding to the intensity of light which has been passed through the translucent film or which has been reflected on the film surface. On the contrary, during the absence of the sprocket holes, the terminal 115 receives a high level signal, and thus, the inverter IN15 produces a low level signal to close the analog switch AS. Accordingly, during this time, the capacitor D3 memorizes the signal of intensity of light reflected on or passed through the film obtained before the analog switch AS closes. Then, when the film advances to position the coded perforation cp to the location A, the intensity of light reflected on or passed through the film increases to increase the input level of operational amplifier OA3 with an increment corresponding to the increment of the light intensity. A constant voltage source E1 produces a reference voltage which is applied to an operational amplifier OA5. The level of the reference voltage is set to a level slightly smaller than the difference in the output of the operational amplifier OA1 between presence and absence of a film having a maximum reflectivity or maximum transparancy. Therefore, the comparator OA5 produces a high level signal when the output from the buffer amplifier OA3 increases in response to the detection of coded perforation by the photo-coupler. Since the terminal 115 receives a high level signal during the absence of the sprocket holes, an AND gate AN37 produces from its output 117 the signal which has been obtained from the camparator OA5.

In the case where the photo-coupler is a reflective type, the reflectivity of the film surface and the reflectivity of the back support on which the film slides at the location A should be different for the distinguish between the absence and presence of the coded perforation. For this purpose, the back support should have a reflectivity comparatively higher than that of the film surface, such as a mirror, or a reflectivity comparatively lower than that of the film surface, such as a matted plate, or a plate with an opening formed at the location A. In the latter case, the output level of the buffer amplifier OA3 drops a predetermined level from the ground level upon detection of the coded perforation. Therefore, in this case, the non-inverting input of the comparator OA5 should be connected with a constant voltage source having a predetermined voltage level below the ground level so that when the inverting input of the comparator OA5 receives the negative level signal from the buffer amplifier OA3, a similar operation as described above can be carried out.

In a manner described above, the circuit shown in FIG. 13 first memorizes the signal from the light receiving element PD1 at the moment when the sprocket hole moves past the detecting location B during the advance of the film, and then compares the memorized signal with a newly obtained signal from the light receiving element PD1 at the moment when the coded perforation moves past the detecting location A. The difference in the signal level indicates the presence of the coded perforation.

Figure 14:
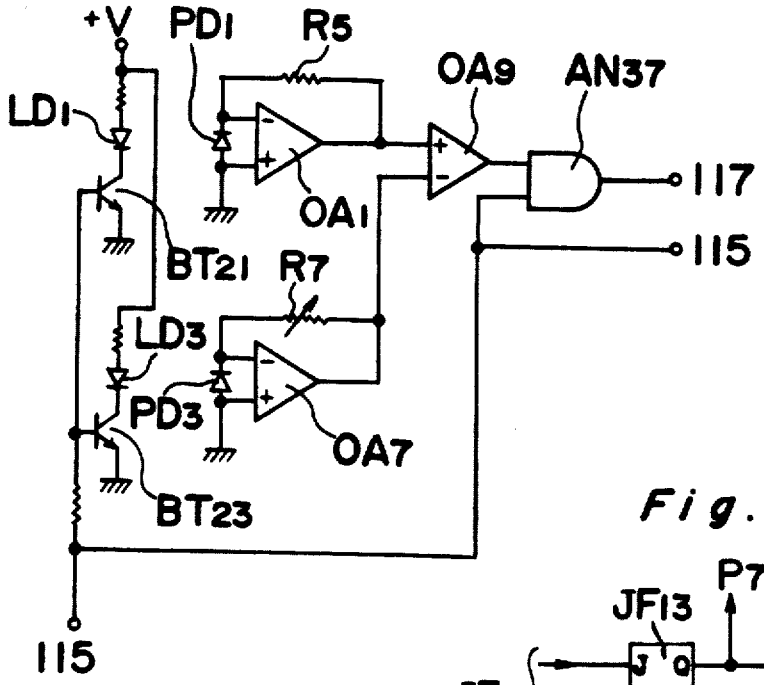
FIG. 14 is a circuit diagram showing another example of coded perforation detector shown in FIG. 2.

Referring to FIG. 14, there is shown another example of coded perforation detector 9. A photo-coupler defined by a light emitting diode LD1 and a light receiving element PD1 is provided at the location A (FIG. 12) in the same manner as that described above in connection with FIG. 13. Similarly, another photo-coupler defined by a light emitting diode LD3 and a light receiving element PD3 is provided at the location B (FIG. 12). The light emitting diodes LD1 and LD3 are actuated by transistors BT21 and BT23, respectively, and these transistors BT21 and BT23 are turned on and off by a signal obtained from the terminal 115. Therefore, the light emitting diodes LD1 and LD3 are supplied with power intermittently to emit light only when the sprocket hole is not present in the detecting location B. In other words, during the sprocket hole is positioned in alignment with the location B, no light emits from either one of the light emitting diodes LD1 and LD3, and during the sprocket hole is not in alignment with the location B, light emits from both of the light emitting diodes LD1 and LD3. When this arrangement is employed, the light emitting diodes LD1 and LD3 emit light only when it is necessary to detect coded perforation.

A circuit defined by light receiving element PD1, feedback resistor R5 and operational amplifier OA1, and a circuit defined by feedback resistor R7 for the adjustment and operational amplifier OA7 produce output voltage signal relative to the intensity of light received by the light receiving elements PD1 and PD3, respectively. It is to be noted that the resistor R7 is adjusted to such a value as to set the voltage level from the operational amplifier OA7 slightly higher than that from the operational amplifier OA1 when the intensity of light received by the light receiving elements PD1 and PD3 is the same.

Therefore, when the coded perforation cp comes in alignment with the location A where the light receiving element PD1 is provided, the intensity of light received by the light receiving element PD1 increases to increase the output voltage level of the operational amplifier OA1 much higher that that from the operational amplifier OA7. Thus, a comparator OA9 produces a high level signal which is applied through AND gate AN1 to output terminal 117.

On the contrary, when there is no coded perforation cp at the location A, the light receiving elements PD1 and PD3 receive the same intensity of light. In this case, the operational amplifier OA7 produces a voltage signal having a level slightly higher than that from the operational amplifier OA1, and therefore, the comparator OA9 produces a low level signal. It is to be noted that the resistor R7 can be adjusted in the following steps. After loading the film transistors BT21 and BT23 are turned to conductive state, and under this condition, the resistor R7 is adjusted to render the output level from the operational amplifier OA1 slightly lower than that from the operational amplifier OA7. The difference in the output level should be no longer than the difference between the signal obtained when a film having maximum reflectivity or transparency is loaded and the signal obtained when no film is loaded.

In the case where the photo-coupler is a reflective type with a back support having low reflectivity, the output from the light receiving element PD1 decreases upon detection of the coded perforation cp. In this case, the output of the operational amplifier OA1 should be connected to inverting input of the comparator OA9, and the output of the operational amplifier OA7 should be connected to non-inverting input of the same, and at the same time, the resistor R7 should be adjusted in such a manner as to render the output level from the operational amplifier OA1 slightly greater.

Referring to FIG. 15, there is shown a further example of coded perforation detector 9. A pair of contacts 63 and 65 are provided on opposite sides of the film for detecting the presence and absence of a coded perforation cp by the make and break of the connection between contacts 63 and 65. An inverter IN17 receives signals from the terminal 115 and produces a low level signal only when the contacts 63 and 65 are positioned between neighboring two sprocket holes at which a coded sprocket can be detected. Such a low level signal from the inverter IN17 conducts a transistor BT25. Accordingly, during this time, if the contacts 63 and 65 detect a coded perforation, as shown, a NAND gate NA receives a low level signal, and thus, it produces a high level signal from setting a high level signal at a junction between a capacitor C5 and a resistor R9. Thus, inverter IN19 produces a low level signal and inverter IN21 produces a high level signal. The low level signal produced from the inverter IN19 is fedback through a resistor R11 to NAND gate NA. After a predetermined period of time determined by a time constant of capacitor C5 and resistor R9, the input signal to the inverter IN19 drops below a predetermined level. Thus, inverter IN19 produces a high level signal and inverter IN21 produces a low level signal. Then, when the connection between the contacts 63 and 65 breaks, the NAND gate NA receives high level signals to its both inputs for producing a low level signal. Thus, a high level signal produced from the inverter IN19 and a low level signal produced from the inverter IN21 are maintained.

As understood to those skilled in the art, the circuit described above defines a one-shot circuit that can eliminate chattering. In the above circuit, it is preferable to render the time length in which the inverter IN21 produces a high level signal shorter than the contacting time between the contacts 63 and 65 obtained when the film is advanced at its maximum speed.

It is to be noted that the power supply to the circuits described above in connection with FIGS. 13 to 15 is effected only during the film advance by the control of transistor BT1, as in a similar manner described above in connection with FIG. 11.

Figure 16:
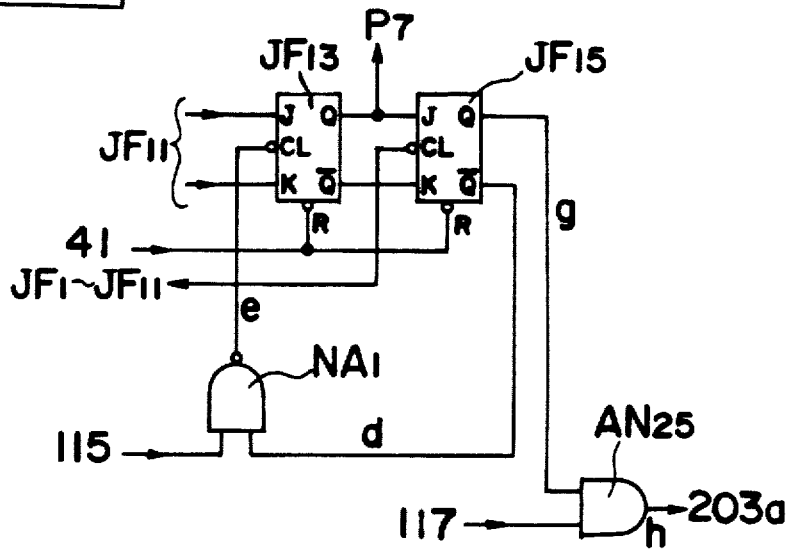
FIG. 16 is a circuit diagram showing a modification of the reader shown in FIG. 5.

Referring to FIG. 16, there is shown a modification of a reader 11 shown in FIG. 5. In FIG. 16, only the parts which differ from those in FIG. 5 are shown. More particularly, a circuit in FIG. 5 defined by AND gates AN21 and AN23, flip-flops F23 and F25, OR gate OR13, inverter IN1 and counter CO13 is replaced by a circuit defined by JK flip-flop JF15 and NAND gate NA1.

According to the circuit shown in FIG. 16, JK flip-flop JF13 receives signal representative of coded perforation from the JK flip-flop JF11, and when it receives data of the first coded perforation in the section AH (The data will be "1", as shown in FIG. 6, for the coded perforation shown in FIG. 1), JK flip-flop JF15 receives data "1" which has been stored in the JK flip-flop JF13 and representative of coded perforation in the section IH. Accordingly, at this moment, JK flip-flop JF15 produces a high level signal from its Q terminal along a line g and a low level signal from its Q terminal along a line d. Thus, NAND gate NA1 continues to produce a high level signal for maintaining data in the shift register defined by JK flip-flops JF1 to JF15. And, since AND gate AN25 receives a high level signal along the line G, the pulse signal obtained from the terminal 117 passes through the AND gate AN25 and is transmitted to terminal 203a.

As apparent from the foregoing description, the camera according to the present invention can automatically set film speed upon loading of a film. Furthermore, the camera of the present invention can carry out an exposure calculation even when there is no film loaded.

Moreover, the film speed display can be effected only when it is required to reduce the power consumption in the display.

Although the present invention has been fully described with reference to the accompanying drawings, many modifications and variations thereof will now be apparent to those skilled in the art, and the scope of the present invention is therefore to be limited not by the details of the embodiment described above, but only by the terms of appended claims.

What is claimed is:

1. A camera capable of automatically responding to film speed data received from a film to be loaded in the camera comprising:

means for receiving digital date representative of the film speed from the film;

means for storing the digital film speed data received by said receiving means;

a digital calculating means, responsive to the digital data stored in said storing means, for calculating digital exposure information;

means for generating predetermined invariable digital data representative of a constant film speed capable of being substituted for the digital data to be stored in said storing means;

means for automatically adopting said invariable digital data to substitute it for the digital data from the film when said storing means is incapable of storing the digital data from the film;

means for digitally displaying the result of the calculation by said calculating means; and means for controlling the exposure of the camera in accordance with the result of the calculation by said calculating means.

2. A camera as claimed in claim 1 further comprising means for displaying the digital film speed data utilized by said calculating means.

3. A camera capable of automatically responding to film speed data received from a film to be loaded in the camera comprising:

means for receiving digital data representative of the film speed;

means for storing the digital film speed data received by said receiving means;

means for generating predetermined invariable digital data representative of a constant film speed capable of being substituted for the digital data to be stored in said storing means;

means responsive to the digital data stored in said storing means for displaying the digital film speed data; and means for automatically adopting said invariable digital data to substitute it for the film data when said storing means is incapable of storing the film data.

*4. A camera for use with a film roll of the type in which film speed data is to be automatically provided when the film is loaded in the camera, comprising:*

*means for reading out said film speed data and providing a first data signal representative thereof;*

*means for manually setting film speed data and providing a second data signal representative thereof with the film of the type loaded in the camera;*

*manually operable means for outputting a first and second control signal;*

*selection means for selecting said first data signal in response to said first control signal and for selecting said second data signal for said first signal in response to said second control signal; and*

*means for controlling the camera exposure in accordance with the data signal selected by said selection means.*

*5. A camera for use with a film roll of the type in which film speed data is to be automatically provided when the film is loaded in the camera, comprising:*

*means for reading-out said film speed data and providing a first data signal representative thereof;*

*means for manually setting film speed data and providing a second data signal representative thereof with the film of the type loaded in the camera;*

*manually operable means for outputting a control signal;*

*means for selecting the data signal by substituting said second data signal for said first data signal in response to said control signal and maintaining said second data signal in the absence of said control signal; and*

*means for controlling the camera exposure in accordance with the data signal output from said data selecting means.*

* * * * *